United States Patent [19]

Rodriguez et al.

[11] Patent Number: 4,512,387
[45] Date of Patent: Apr. 23, 1985

[54] POWER TRANSFORMER WASTE HEAT RECOVERY SYSTEM

[76] Inventors: Larry A. Rodriguez, 7452 18th St., NE., St. Petersburg, Fla. 33702; Antonio A. Padilla, 15803 Deep Creek La., Tampa, Fla. 33624; Ned B. Spake, 2711 Summerfield Rd., Winter Park, Fla. 32792

[21] Appl. No.: 383,181

[22] Filed: May 28, 1982

[51] Int. Cl.³ ............... F22D 1/00; F22D 3/00; F24H 3/04
[52] U.S. Cl. .................. 165/1; 122/451 R; 237/12.1; 336/57; 336/55; 165/47; 165/39; 165/40; 165/104.33
[58] Field of Search ............ 165/104.33, 47, 1, 39, 165/40, 167, DIG. 12; 336/55, 57, 58; 237/12.1; 122/1 C, 451

[56] References Cited

U.S. PATENT DOCUMENTS

| | | | |
|---|---|---|---|
| 3,212,563 | 10/1965 | Schrader | 165/45 |
| 3,255,084 | 6/1966 | Doroszlai | 165/40 |
| 4,240,499 | 12/1980 | Kals | 165/DIG. 12 |

FOREIGN PATENT DOCUMENTS

| | | | |
|---|---|---|---|
| 2027621 | 12/1971 | Fed. Rep. of Germany | 336/55 |
| 151765 | 10/1955 | Sweden | 336/57 |

*Primary Examiner*—Albert W. Davis, Jr.
*Attorney, Agent, or Firm*—Duckworth, Allen, Dyer & Pettis

[57] ABSTRACT

Large power transformers such as used at electrical generating plants utilize oil for cooling with the heat removed by air cooled radiators. Several air cooled radiators are removed from the transformers and the oil circulated through plate heat exchangers which provide a heat transfer path to a fluid cooling medium such as water. Flow transducers and electrical temperature sensors may be used to monitor the flow rates of the oil and water, and the temperature of the oil and water in various parts of the system. These parameters are controlled to maximize the transfer of waste heat from the transformer to the water. The heated water is then utilized to perform useful work. For example, in a power plant having package boilers, the boiler makeup water is preheated with the transformer waste heat thereby reducing the energy requirements of the system.

5 Claims, 5 Drawing Figures

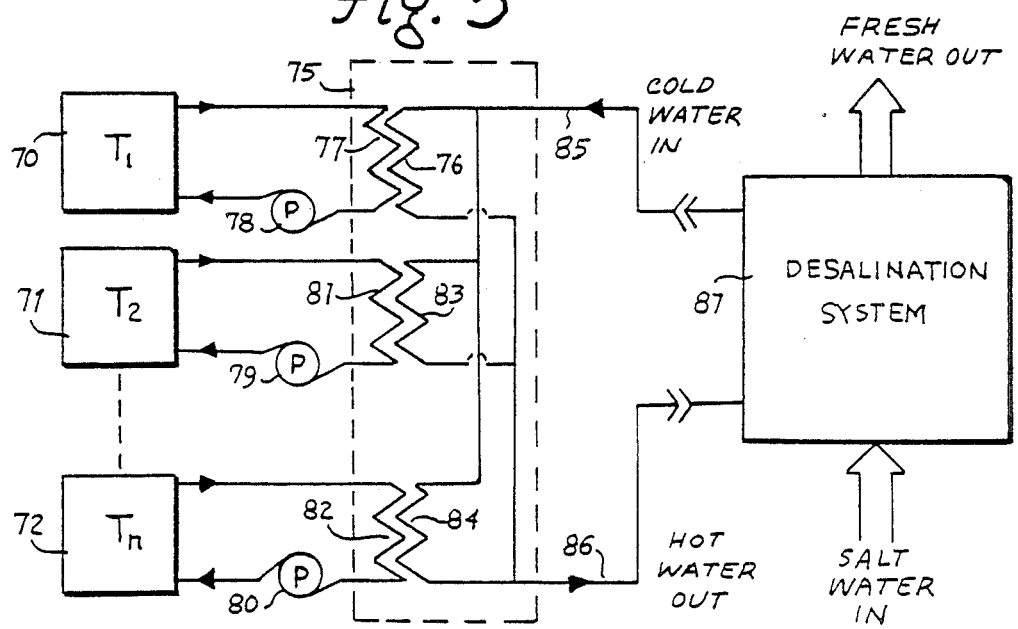

POWER TRANSFORMER WASTE HEAT RECOVERY SYSTEM

BACKGROUND OF THE INVENTION

1. Field of the Invention

The present invention relates to waste heat recovery from power transformers and more particularly to a process and apparatus for extracting useful energy from cooling oil in large power transformers.

2. Description of the Prior Art

Electrical generating plants require power transformers to produce the high voltages needed for power transmission. Losses occur in these transformers due to eddy currents, hysteresis, dielectric loss, $I^2R$ loss from the exciting current, and the load losses due to the $I^2R$ loss from the load currents. Although such transformers are quite efficient, for example in the range of 96–99%, significant amounts of heat are generated due to the extremely high powers handled by the transformers.

As an example, a transformer operating with 100 megawatt generators may have a no load loss of 100 kilowatts plus a load loss of about 170 kilowatts at 75 MVA load equivalent to 921,240 btu/hr of waste heat. Such a transformer may have a core and coils weighing about 170,000 pounds, an 83,000 pound tank, and a total volume of oil weighing about 110,000 pounds. It has been estimated that in a typical 50 MVA power transformer, the cost of the waste energy due to these losses will be over $62,000 a year at present day energy costs. Presently, practically all utilities utilize air coolers for removing the heat from the transformer oil thereby rejecting the heat to the ambient air.

In view of the large amounts of waste heat from power transformers, methods and apparatus for recovering this heat for useful purposes can significantly improve the operating efficiencies of power plants and power stations. Of the various possibilities, the most promising technique is the use of water cooling of the oil, raising the temperature of the cooling water to a sufficient level that the hot water may be put to other uses. Thus, one problem faced in this approach is to obtain a high enough water temperature to be useful. In a system utilizing flow of water through a heat exchanger to cool the oil, the output temperature of the water will be a function of the rate of flow. A low flow rate will produce a higher temperature of the water and also higher temperatures in the transformer. On the other hand, a high flow will transfer a greater amount of heat from the transformer to the water but the water temperature will be lower. Therefore, a balance between heat rejection and heat recovery must be achieved.

Fortunately, there are many uses for water having a temperature range of 140°–160° F. and therefore a system which will produce temperatures in this range will be useful. Another problem involves transferring of the heat from the oil to the water. Therefore, an efficient heat exchanger will be required. To effectively use the available hot water, it is necessary that the user be relatively close to the source of the heated water. The use of the hot water produced may, in many installations, be used by equipment at the power plant. In other cases, the utility could sell the hot water generated to customers living nearby at a lower cost than possible with the use of electricity or gas for water heating. This latter application is attractive since it would help reduce peak load requirements by reducing the customers' electric energy usage for water heating.

Water cooling has been used for transformers in the prior art but was usually implemented by disposing copper coils inside the transformer tank just below the surface of the oil. Water was then circulated through the coils to cool the transformer oil. However, water fouling and leakage produced problems with these systems and the air cooling systems are much more common at the present. When transformer manufacturers are requested to supply water cooled systems, it is common for them to supply a simple shell and tube type heat exchanger to replace the air cooled radiators in a typical transformer. However, this type of heat exchanger has a primary objective of heat rejection and does not provide means for achieving a balance between heat rejection and heat recovery.

SUMMARY OF THE INVENTION

The present invention utilizes large air cooled power transformers, which preferably can be maintained at a high load factor, in which a part of the air cooled radiator system is removed and a portion of the cooling oil is circulated externally through a special heat exchanger of the plate type. A common medium for removing the heat from the cooling oil is water and the invention will be disclosed with reference to an exemplary cooling oil to water heat exchanger. However, it is to be understood that the transformer waste heat may be transferred to other media such as freon, other oils and the like. The plate type heat exchanger is preferred since it requires about $\frac{1}{8}$ to $\frac{1}{2}$ the surface of the shell and tube type for the same rate of heat transfer and capacity. Advantageously, in the plate heat exchanger used in the invention, the number of plates may be decreased, increased, or rearranged to optimize the heat exchanger to the particular transformer with which it is to be used. The plate heat exchanger also has the advantage of eliminating leakage between the water and oil in a normal failure mode. Each medium has its own individual gasket seal with all areas between the gaskets vented to the atmosphere. Therefore, a gasket failure in either system would leak to the atmosphere and not to the other system.

An exemplary system in accordance with the invention utilizes the waste heat recovered from the transformer by the plate heat exchanger to preheat makeup water for package boilers.

The oil input to the heat exchanger is taken from the top of the transformer tank and the cooled oil is returned to the bottom of the tank, with an oil pump providing pressure for circulating the oil. The normal source of makeup water, which may be from site wells via a water softener system, is taken from an auxiliary storage tank and pumped through the water side of the heat exchanger. As previously mentioned, the water temperature as well as the percentage of heat that is recovered is a function of the rate of water flow through the heat exchanger. Therefore, a control system is provided to permit optimization of the water flow in accordance with the system and load requirements. Electrical temperature sensors are provided at the transformer cooled oil input, at the hot oil output, and water temperature sensors are provided at the cold water input to the heat exchanger and at the hot water output from the heat exchanger. Similarly, an oil flow transducer is provided in the oil circuit and a water flow transducer in the water circuit. These sensors and transducers may be connected to appropriate readout devices on a control panel, permitting the operator to control the water flow and the oil flow to meet system requirements.

Although the oil pump provides primary circulation of the cooling oil through the transformer and the heat exchanger, flow may advantageously occur from gravity flow, thermal siphoning and the like.

It is therefore a principal object of the invention to provide a process and apparatus for utilizing waste heat from large power transformers.

It is another object of the invention to increase the energy efficiency of large power transformers.

It is yet another object of the invention to provide a process and apparatus which will maximize the capacity of a large transformer through a more effective cooling system.

It is still another object of the invention to provide a process and apparatus for removing heat from large power transformers which includes instrumentation to permit control of oil flow and water flow to permit optimization of system operation.

It is a further object of the invention to provide a plate heat exchanger for connection to an air cooled transformer for utilizing the waste heat from the transformer to raise the temperature of water to a useful value.

It is still a further object of the invention to provide a process and apparatus for transferring waste heat from a large power transformer to makeup water used for boilers.

It is another object of the invention to provide a system for supplying domestic hot water to utility customers heated by power transformer loss heat to thereby reduce peak loads on the utility from electric water heating by the customers.

These and other objects and advantages will become apparent from the following detailed description and the drawings.

BRIEF DESCRIPTION OF THE DRAWINGS

FIG. 5 is a simplified schematic diagram of an alternative embodiment of the invention utiizing a plurality of power transformers and a single heat exchanger with a desalination system representing the useful thermal load.

DETAILED DESCRIPTION OF THE PREFERRED EMBODIMENT

Figure 1:
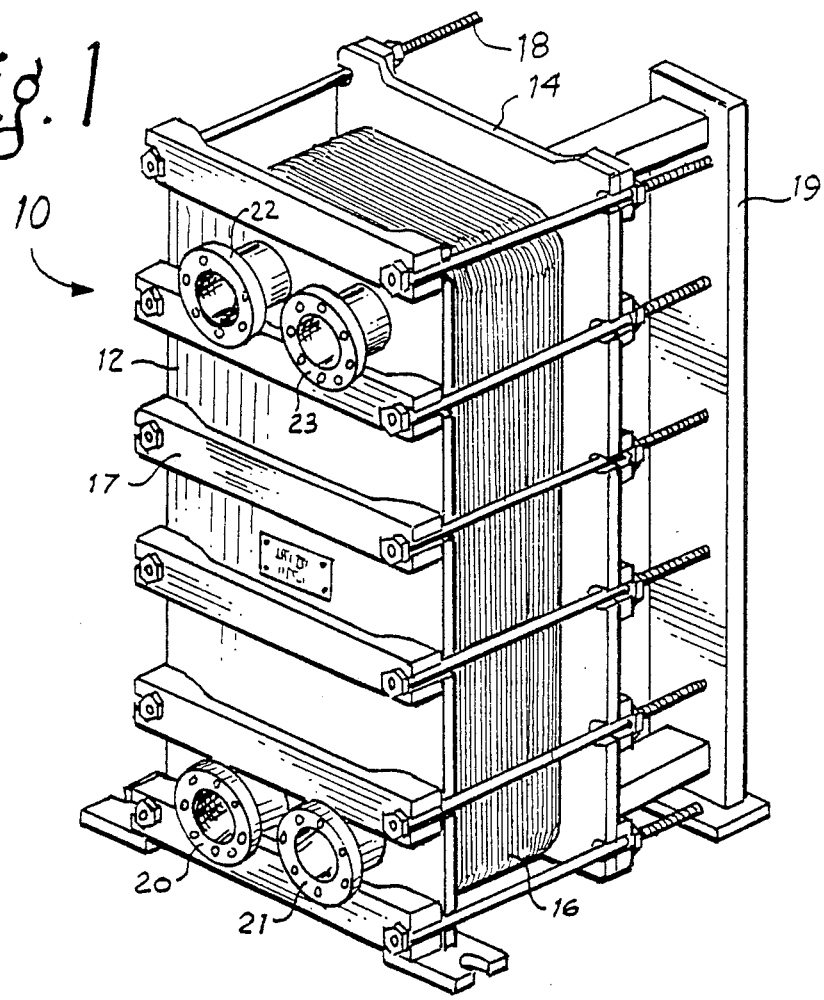
FIG. 1 is a perspective view of a typical plate heat exchanger of the invention.

The process and apparatus of the invention will be explained with reference to the preferred embodiment as applied to a utility power transformer in which the heat losses are utilized to preheat the makeup water system for a group of small package boilers. Preheating of the makeup water reduces the total fuel required by the boilers since the invention provides a large proportion of the sensible heat required to bring the water to steam condition.

A power transformer may be a type manufactured by the Wagner Electric Corporation rated at 75/100/125 MVA, three phase, 230 kV/13.279 kV. Two 50 MW combustion turbines are suitable for generating the load through such a transformer. The power transformer utilizes four banks of radiators, with a bank on each side of the transformer case for air cooling of the transformer oil. An oil pump having a capacity of 250 GPM at two feet of head is provided for each bank of radiators.

It is critical to the invention to utilize an oil-to-water heat exchanger which will provide optimum heat transfer characteristics with minimum capital and operating cost per BTU recovered, that will occupy minimum space, and that will maintain transformer oil integrity. Although other types may provide some utility, it has been found that a plate heat exchanger of the type shown generally at 10 in FIG. 1 requires about one third to one half the surface area of a shell and tube type for the same rated capacity. The plate heat exchanger 10 consists of a frame 19 having a pair of shells 14 which clamp a multiplicity of plates 16 therebetween by a series of rods 18. The plate heat exchanger 10 is preferably the type supplied by the American Heat Division of Alfa-Laval, Inc. in which plates 16 are designed to provide a large surface area. For example, a herringbone design advantageously provides a pattern of flow paths for oil and for water that maximize a common surface area for optimum heat transfer. Gaskets between the plates are disposed such that areas outside of the respective gasketed oil flow path and water flow path are vented to the atmosphere. If a leak should occur, pressure in the affected flow path would cause the medium to be vented to the air rather than to the other medium. The leak is readily detected and there is no contamination of either the oil or the water from the leak. As may be understood, it is necessary to maintain positive pressure on both the hot and cold mediums to ensure detection of a leak. The system pumps and nitrogen gas pressurization of the transformer provide such pressure.

As may be noted from FIG. 1, the number of plates can be increased or decreased when required. Front shell 14 includes oil inlet 23, oil outlet 21, water inlet 20, and water outlet 20.

Figure 2:
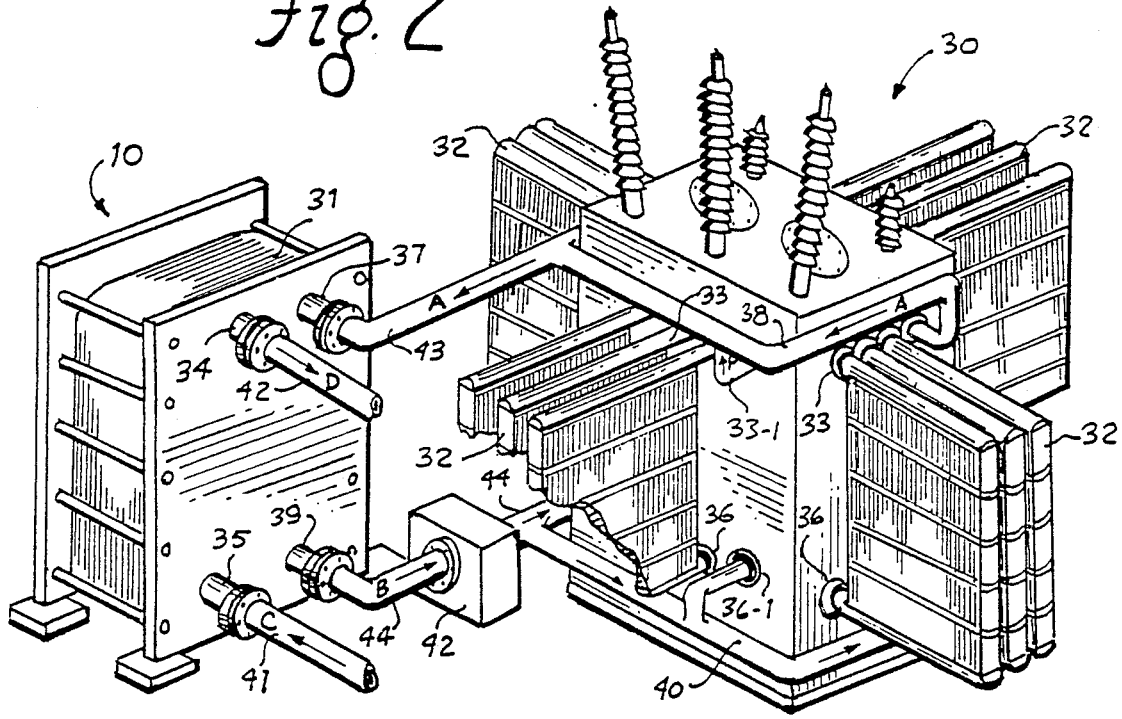
FIG. 2 is a perspective view of a large power transformer having air cooled radiators and a plate heat exchanger connected thereto.

Turning now to FIG. 2, a typical installation of a plate heat exchanger 10 and power transformer 30 is shown. Power transformer 30, as used in the prior art, comprises case 45 having four banks of air cooling radiators 32 disposed on each of the four sides thereof. In the example shown, each bank 32 consists of four separate radiators. The upper end of a radiator 32 is coupled to a hot oil outlet 33 and the lower end is connected to cool oil inlet 36. Although not shown, a set of fans and an oil pump is associated with each bank of radiators 32.

In accordance with the invention, one radiator is removed from each bank. A hot oil header 38 is connected to the four hot oil outlets 33-1 and a cool oil header 40 is connected to the four cool oil inlets on each side of the transformer 30 which originally connected to the removed radiators 36-1. A plate heat exchanger 10 is provided having its oil inlet 37 connected by piping 43 to header 38. The oil outlet 39 of heat exchanger 10 is connected via piping 44 and oil pump 42 to header 40. Pump 42 circulates hot oil from the top of transformer 30, indicated by arrow A, through heat exchanger 10 and into the cool oil inlets 36-1 at the bottom of transformer 30 as indicated by arrow B. It is to be understood that oil flow may also occur by gravity, thermal siphoning or the like.

The removal of a radiator from each bank of radiators 32 ensures that oil flow from all parts of the core and coils of transformer 30 will be circulated to heat exchanger 10. The transformer 30 originally utilizes a temperature sensor responsive to the temperature at the high oil level point in the transformer case 45. When a selected temperature is reached, the sensor energizes the oil pumps which circulates the oil through the radiators 32 and, when required, energizes fans to assist in heat removal from radiators 32. The transformer 30 is designed for specific ambient temperature conditions. Variations in ambient conditions from design values generally require correction in the electrical loading levels of transformer 30. Higher loadings can be achieved with lower ambient temperatures, and vice-versa. In accordance with the invention, cool water from the water source enters heat exchanger 10 via piping 41 and inlet 35 and heated water exits via outlet 34 and piping 42 as indicated by arrow D. As may now be recognized, heat flows from the high temperature oil into the incoming cool water, raising the water temperature. As will be discussed below, the oil-to-water heat exchanger 10 will prevent the oil temperature from rising sufficiently to energize the radiator pumps and fans thereby permitting maximum recovery of the waste heat by means of the invention and reducing power consumption. In such case, the operating costs of the fans and pumps is avoided while recovering the waste heat, and the transformer 30 will generally operate at a lower temperature, extending the life of the winding insulation. Alternatively, the transformer 30 may be loaded electrically beyond its normal rating since the invention increases the heat removal capacity of the system. The oil temperature could then rise to the point that the radiator pumps and fans would operate.

Figure 3:
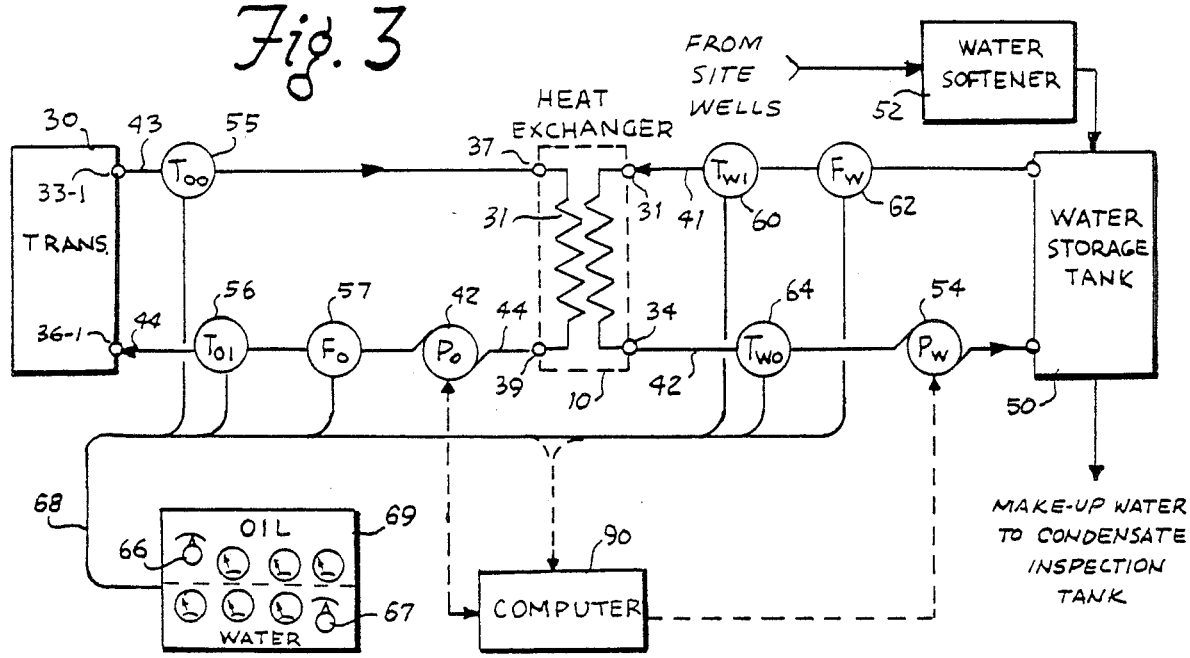
FIG. 3 is a schematic diagram of a complete system in accordance with the invention in which the useful thermal load is a boiler makeup water preheat system.

A schematic diagram is shown in FIG. 3 for the installation of FIG. 2 used to provide preheating of makeup water for packaged boilers. The usual source of makeup water which may be from site wells is fed through water softener 52 to water storage tank 50. Cold water from tank 50 is fed via piping 41 to the water side of heat exchanger 10 and the heated water is fed to tank 50 via piping 42 with water pump 54 serving to circulate the water. Thus, hot water is stored in tank 50 which has an output line to the condensate inspection tank as indicated. Thus, the makeup water is preheated from the waste heat produced in transformer 30 in accordance with the invention.

As previously discussed, it is necessary to achieve a balance between the heat rejection from transformer 30 and the recovery of the heat energy by heat exchanger 10. The parameters to be controlled are the transformer oil outlet temperature $T_{oo}$, the transformer oil inlet temperature $T_{oi}$, and the rate of oil flow $F_o$ in the oil circuit, and the inlet water temperature, $T_{wi}$, the water outlet temperature $T_{wo}$, and the water flow rate $F_w$ for the water circuit. The optimum values of these parameters will vary with the electrical load on transformer 30 and the volume of makeup water required. To permit optimization of the system as these conditions change, a set of temperature sensors is installed in the oil circuit and in the water circuit. Temperature sensor 55 which measures $T_{oo}$ is installed in pipe 43 carrying the hot oil out of the transformer 30. Although sensor 55 may be of any suitable type, it is preferred that an electrical resistance bulb or the like be used to permit remote reading of the temperature. Similarly, temperature sensor 56 is installed at the oil inlet port of transformer 30 in piping 44 and measures $T_{oi}$. A flow rate transducer 57 is also installed in piping 44 to measure the oil flow rate, $F_o$.

In the water circuit, temperature sensor 60 measures $T_{wi}$ and sensor 64 measures $T_{wo}$. Flow transducer 72 measures the water flow $F_w$ through heat exchanger 10. The output of the electrical transducers and sensors are carried by bus 68 to a remotely located control panel 69 having readouts of these operating parameters of the system. The operator then may make appropriate adjustments in the flow rates by means of controls 66, 67 to achieve maximum heat recovery consistent with the required water temperature. After installation of the system, the effect of these various parameters may be determined and recorded for future reference.

Figure 4:
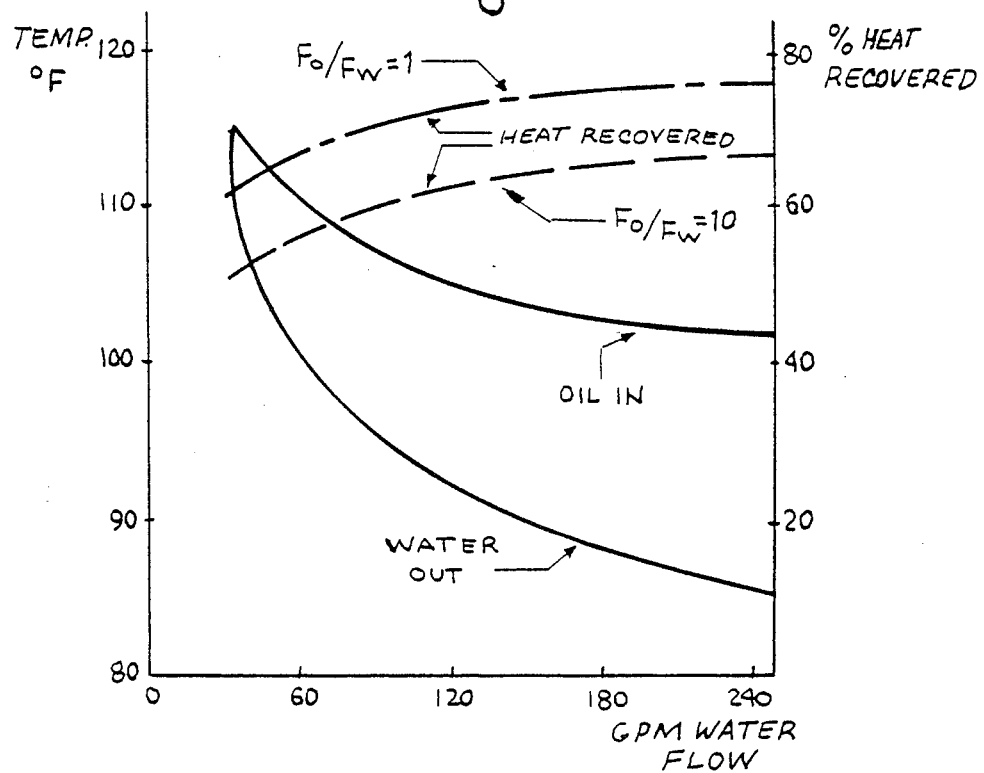
FIG. 4 is a graph showing the relations among the heat recovered, the hot oil inlet temperature, and the hot water outlet temperature for one implementation of the invention.

In FIG. 4, a set of curves for a system in accordance with the preferred embodiment is shown as a function of the rate of water flow through heat exchanger 10. The maximum water temperature is achieved for a low rate of flow which also produces a maximum oil inlet temperature. Thus, the percentage of heat recovered is lower at this flow rate. As the flow rate increases, a higher percentage of heat is recovered but the inlet oil to the transformer has a lower temperature. However, the water from the heat exchanger to the storage tank is at a much lower temperature. In the example shown, if the demand for makeup water is sufficient that the majority of the preheated water is useful, then the higher flow rate is desirable since the lower oil temperature will contribute to increased transformer efficiency and a maximum amount of waste heat is recovered. The percent heat recovered is shown for two values of flow ratio $F_o/F_w$. It may be noted that a ratio of unity gives the highest percentage of heat recovery in the exemplary system.

For other uses of the heated water requiring a higher water temperature such as for domestic use, it would be necessary to operate at a low water flow rate to be able to provide the water at a useful temperature. Depending upon the application of the heated water, parametric charts may be generated showing percent heat recovered, the oil inlet temperature and the water outlet temperature as a function of both water and oil flow. Such charts may then be utilized to maintain optimum system performance. Once the parameters of a specific implementation of the invention is determined, a computer or microprocessor may be programmed to automatically maintain the optimum heat recovery versus heat rejection in the transformer as indicated in FIG. 3 by computer 90.

Although the system shown in FIG. 2 indicates the use of one heat exchanger 10, additional radiators 32 can be removed and replaced with additional plate heat exchangers. However, it is preferable that air cooling be maintained as a backup system to a heat recovery system. When the transformer is operated at a high top oil temperature to improve the quality of the waste heat, power outages to the pumping system could produce problems requiring removal of loads from the transformer to prevent damage. Thus, care must be taken in integrating the transformer into the recovery system.

A typical heat recovery system using one transformer and a plate heat exchanger has been described as an example of the invention. The invention is also eminently suitable for use with multiple power transformers. Advantageously, the preferred plate heat exchanger may be configured to have a plurality of oil flow paths coupled to a single water flow path. Referring to FIG. 5, a schematic diagram of this embodiment of the invention is shown. Several transformers, $T_1$ to $T_n$, are shown at 70-72. Each transformer 70-72 has a part of its air cooled radiator system removed, as described heretofore, and the oil outlets and inlets for the removed radiators of each transformer connected to the respective oil flow paths 77, 81, 82 via pumps 78, 79, 80. Heat exchanger 75 utilizes a single output water flow path of parallel paths 76, 83, 84 coupled in a heat exchange relationship to oil flow paths 77, 81, 82.

For an application of the invention to provide domestic hot water to nearby utility customers, the system of FIG. 5 or the equivalent would be necessary to furnish the required volume of hot water. Another application for the invention where the electric utility transformers are located near the ocean is the desalination of water. A highly developed method which uses relatively low temperatures is the multistage flash distillation process as described in "Engineering for Pure Water", *Mechanical Engineer*, January, 1968, pages 18-25. As indicated in FIG. 5, a desalination system 87 may be the useful thermal load on the heat recovery system of the invention. Although not shown, temperature and flow sensors are used, preferably as inputs to preprogrammed computers for controlling and adjusting the individual flow rates to optimize heat recovery. Although heat exchanger 75 is shown schematically to have water flow paths 76, 83, 84 coupled separately to the oil flow paths 77, 81 and 82, it is to be understood that the water flow paths are equally dispersed and distributed among the oil flow paths to equalize the temperature gradient between each oil flow path and its associated portion of the water flow path.

The above described apparatus provides a process for utilizing the waste heat from large power transformers to heat a medium to a temperature which makes it useful for various applications. This process comprises the steps of:

1. Transferring hot transformer oil from the top of the transformer tank through a plate heat exchanger having an oil flow path;

2. Transferring a medium to be heated through a medium flow path in the heat exchanger in which the medium flow path is in a heat exchange relationship with the oil flow path;

3. Extracting heat from the hot oil flowing through the heat exchanger to the medium flow thereby raising the medium temperature and lowering the oil temperature;

4. Transferring the higher temperature medium to a point of use; and

5. Transferring the lower temperature oil to the bottom portion of the transformer tank.

As may be recognized from the above description, the invention involves the compatibility of two opposing heat transfer criteria previously considered incompatible; i.e. transformer cooling and waste heat recovery. A transformer cooling system is designed to minimize the temperature in the transformer case by maximizing the heat absorption rate by the cooling medium. A waste heat recovery system is usually designed to recover the heat at the highest possible temperature. The invention, through the novel combination of an oil-to-medium plate heat exchanger in conjunction with a power tranformer having air cooling radiators, provides a means for satisfying both criteria: removal of heat at a high rate and at the same time, recovery of energy at a temperature suitable for utilization.

The heat recovery apparatus and process of the invention have been described above with reference to a specific transformer, heat exchanger, transfer medium and application. However, it will be obvious to those of skill in the art to utilize the invention for other applications and to modify the type of transformer and heat exchanger used without departing from the spirit and scope of the invention.

I claim:

1. In an oil-filled power transformer having a plurality of cooling oil inlets and outlets and adapted to permit circulation of cooling oil through the core and coils of said transformer, a cooling and waste heat recovery system comprising:

at least one air-cooled radiator connected to one of said oil inlets and one of said oil outlets;

first pump means connected to said radiator for circulating cooling oil through said radiator;

plate heat exchanger means external to said transformer and having an oil flow path with a hot oil inlet and a cool oil outlet, and a water flow path in a heat transfer relationship with said oil flow path, said water flow path having a cool water inlet and a hot water outlet, said hot oil inlet connected to at least one of said transformer outlets, and said cool oil outlet connected to at least one of said transformer inlets;

second pump means connected between said cool oil outlet and at least one of said transformer inlets for circulating hot oil from said transformer through said heat exchanger means;

third pump means for circulating water through said flow path;

boiler makeup water storage means connected between said hot water outlet and said cool water inlet of said heat exchanger means;

a first set of temperature and flow sensors connected to said transformer oil inlets and outlets;

a second set of temperature and flow sensors connected to said heat exchanger means water inlet and outlet; and control means responsive to said first and second sets of sensors to control said second pump means and said third pump means for maximizing the recovery of heat losses from said power transformer.

2. The system as defined in claim 1 in which said first and second sets of temperature and flow sensors monitor the inlet and outlet temperatures and the flow rates of said cooling oil circulating through said heat exchanger means, and monitor the inlet and outlet temperatures and the flow rate of said water flowing through said heat exchanger means; and said control means is responsive to said temperatures and flow rates to optimize the ratio of flow rates of said cooling oil circulating through said heat exchanger means to the flow rate of said water to maximize the heat absorption rate by said water while minimizing the core and coil temperatures of said transformer.

3. The system as defined in claim 2 in which said flow rate ratio is approximately 1:1.

4. In an oil-cooled power transformer having a plurality of air-cooled radiators for cooling oil circulating through the core and coils of said transformer, the process of recovering energy losses therefrom for preheating boiler makeup water comprising the steps of:

removing at least one of said air-cooled radiators;

connecting a plate heat exchanger in place of the removed radiator;

transferring hot transformer oil from the top portion of the transformer to the heat exchanger;

circulating the hot oil through an oil flow path in the plate heat exchanger;

providing water to the heat exchanger from a source of boiler makeup water;

circulating the boiler makeup water through a water flow path in the plate heat exchanger in which the water flow path is in a heat exchange relationship with the oil flow path, thereby heating the water;

storing the heated water; and feeding the stored heated water to a condensate tank to make up for lost boiler water.

5. The process as defined in claim 4 which comprises;

controlling the rate of flow of oil through the plate heat exchanger oil flow path, and controlling the rate of flow of the water through the plate heater exchanger water flow path;

whereby the rate of flow of oil and the rate of flow of the water causes a sufficiently high maximum oil temperature in the transformer to obtain heated water at a useful temperature and simultaneously maintain the transformer at a safe temperature.

* * * * *